US007142001B2

(12) United States Patent
Bhatti

(10) Patent No.: US 7,142,001 B2
(45) Date of Patent: Nov. 28, 2006

(54) PACKAGED CIRCUIT MODULE FOR IMPROVED INSTALLATION AND OPERATION

(75) Inventor: Irfan A. Bhatti, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 50 days.

(21) Appl. No.: 10/886,145

(22) Filed: Jul. 7, 2004

(65) Prior Publication Data

US 2006/0017454 A1 Jan. 26, 2006

(51) Int. Cl.
*G01R 31/02* (2006.01)

(52) U.S. Cl. .................................................... 324/765

(58) Field of Classification Search .................... None
See application file for complete search history.

(56) References Cited

U.S. PATENT DOCUMENTS 4,322,119 A 3/1982 Baker
4,511,201 A 4/1985 Baker et al.
4,810,956 A * 3/1989 Hvezda et al. .............. 324/754
4,812,949 A 3/1989 Fontan et al.
4,826,440 A 5/1989 Plocek et al.
4,875,457 A 10/1989 Fitzner
4,949,224 A 8/1990 Yamamura et al.
5,559,445 A * 9/1996 Eaddy et al. ............... 324/755
5,802,707 A * 9/1998 Brownell et al. ............. 29/740
6,043,991 A * 3/2000 Sorrentino .................. 361/816
6,301,111 B1 * 10/2001 Katsui ........................ 361/697
6,305,953 B1 10/2001 Shi et al.
6,307,344 B1 10/2001 Pajak et al.
6,319,026 B1 11/2001 Chen et al.
6,328,603 B1 12/2001 Chang
6,347,962 B1 2/2002 Kline
6,349,465 B1 * 2/2002 Brownell et al. ............. 29/740
6,445,201 B1 * 9/2002 Simizu et al. .............. 324/758
6,474,999 B1 11/2002 Givens et al.
6,648,657 B1 11/2003 Korsunsky et al.
6,685,486 B1 2/2004 Zhang et al.
6,703,702 B1 3/2004 Inoue et al.
7,018,240 B1 3/2006 Bourdykina et al.
2003/0132520 A1 7/2003 Watanabe et al.
2003/0159122 A1 8/2003 Iida et al.

OTHER PUBLICATIONS

Presentation X2Y® Technology for connectors, Phicomp a Yageo Company; http://www.yageo.com/pdf/X2y%20In%20Connectors.Pdf.

* cited by examiner

*Primary Examiner*—Jermele Hollington
(74) *Attorney, Agent, or Firm*—Michael Best & Friedrich LLP

(57) ABSTRACT

A module for a packaged circuit. In one embodiment, the module includes at least one ground terminal and at least one signal terminal; a circuit board configured to hold the packaged circuit where the circuit board has an interface terminal and one or more traces electrically connecting the at least one signal terminal of the packaged circuit to the interface terminal; and a conductive bracket having a first side, the first side configured to support the circuit board and having at least one clip, the clip configured to hold at least a portion of the circuit board and to contact the at least one ground terminal of the packaged circuit, the conductive bracket configured to provide at least some electromagnetic shielding for the packaged circuit from sources of electromagnetic energy located opposite the first side of the bracket.

21 Claims, 4 Drawing Sheets

39 34 40 10 26 20 28 24 32 22 36 30 31 38

PACKAGED CIRCUIT MODULE FOR IMPROVED INSTALLATION AND OPERATION

FIELD OF THE INVENTION

Embodiments of the invention generally relate to a module that includes a packaged circuit or a chip. In particular, embodiments of the invention provide a packaged circuit module that provides improved connections and easier installation.

BACKGROUND OF THE INVENTION

Packaged circuits including integrated circuits (which are sometimes called "chips") are used in a variety of applications. Packaged circuits may be used in environments subjected to a variety of phenomena that can affect the operation of the circuit. For example, packaged circuits used in automobiles may be susceptible to vibrations from the vehicle, electromagnetic interference ("EMI") from electric motors used in power accessories, and large temperature changes.

Maintaining packaged circuits may also be difficult. Repairing or replacing a packaged circuit may include removing old soldered connections and/or wires and soldering new connections between the packaged circuit and one or more interfacing components and may be costly in both time and materials. Packaged circuits may also be located in small, tight positions further increasing the difficulty of repairing or replacing them and providing the connections needed for proper functioning.

SUMMARY OF THE INVENTION

In one embodiment, the invention provides a packaged circuit or chip module that includes a packaged circuit containing a plurality of first terminals, and a circuit board supporting the packaged circuit and containing a plurality of secondary terminals and a plurality of terminal traces leading from one or more of the plurality of first terminals to one or more of the plurality secondary terminals. The packaged circuit module may also comprise a bracket configured to support the circuit board and to interface with one or more of the plurality of first terminals.

In another embodiment, the invention provides an interference suppression module that includes a packaged circuit containing one or more terminals configured to be connected to a remote device and one or more ground terminals configured to be connected to ground. The module also includes a circuit board supporting the packaged circuit and containing terminal traces leading from the one or more terminals to one or more secondary terminals and a bracket configured to support the circuit board and to interface with one or more of the one or more ground terminals.

In yet another embodiment, the invention provides a system of suppressing interference generated by a device. The system includes a packaged circuit configured to suppress interference. The system also includes one or more terminals configured to be connected to the device and one or more ground terminals configured to be connected to ground; a circuit board containing the packaged circuit and terminal traces leading from the one or more terminals to one or more secondary terminals; and a bracket configured to support the circuit board and to interface with one or more of the one or more ground terminals.

Additional objects and aspects of embodiments of the invention are illustrated in the drawings and provided in the subsequent description.

DETAILED DESCRIPTION

Figure 1:
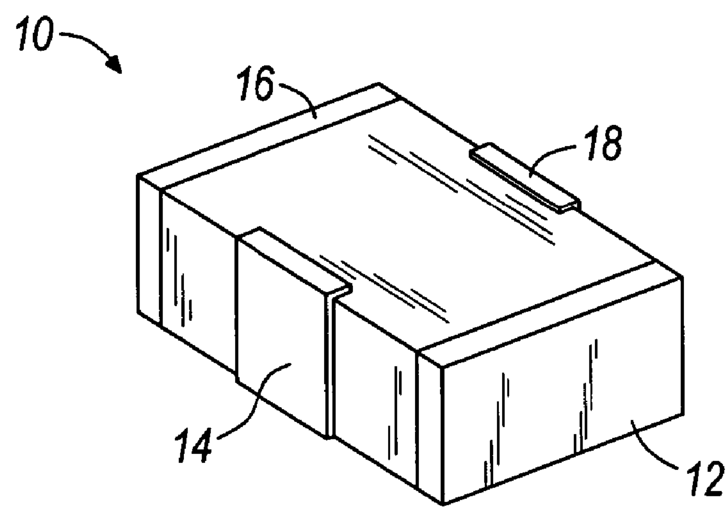
FIG. 1 illustrates an exemplary embodiment of a packaged circuit.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

FIG. 1 illustrates an exemplary packaged circuit 10. The packaged circuit 10 could be an integrated circuit manufactured on a semiconductor, a miniaturized circuit, or an encapsulated circuit. The exemplary packaged circuit 10 has four terminals 12, 14, 16, and 18. Other circuits could have a different number of terminals. Each terminal 12, 14, 16, and 18 is located on one side of the packaged circuit 10. Each terminal may be configured to transmit or receive signals. Each terminal may be an input terminal, an output terminal, an input/output terminal, a ground terminal, a power terminal, a signal terminal, or any other type of terminal. In some embodiments terminals on opposite sides, for example, terminals 14 and 18, are ground terminals, while terminals 16 and 12 are power terminals and designed to be connected to a remote device such as a power supply. In some embodiments, for example, the terminal 16 is a positive terminal and the terminal 12 is a negative terminal that allows current to flow through the packaged circuit 10. The positive and negative terminals may also be reversed making the terminal 16 the negative terminal and the terminal 12 the positive terminal.

The packaged circuit 10 may be configured with various processing capabilities. For example, the packaged circuit 10 may be configured to filter or otherwise reduce the impact of electromagnetic interference generated by an electric motor. In one embodiment, the packaged circuit 10 takes the form of an X2Y® device manufactured by X2Y® Attenuators, LLC. X2Y® devices take multi-layer capacitor technology used for filtering and insert ground, or shielding electrodes between each capacitor. The additional ground electrode plates are then connected to the sides of the component adding two ground terminals and forming a four-terminal device. The ground electrode plates provide a shorter line-to-ground capacitance that provides reduced attenuation and less unwanted inductance. The X2Y® device contains one X capacitor and two balanced Y capacitors in one integrated packaged. The two types of capacitors allow the device to operate in both a common mode and differential mode simultaneously. The X2Y® technology can be used in a number of devices including switch-mode decoupling capacitors, AC & DC leaded devices, SMT filters, planars, multicap arrays, polymer based chips, ceramic chip filters, thin film filters, thick film filters, ferrite devices, leaded MOV filter/surge devices, and planar MOV surge devices.

Besides providing filtering, the packaged circuit 10 may also be configured to relay output signals generated by various devices or provide operating instructions to various components.

Figure 2:
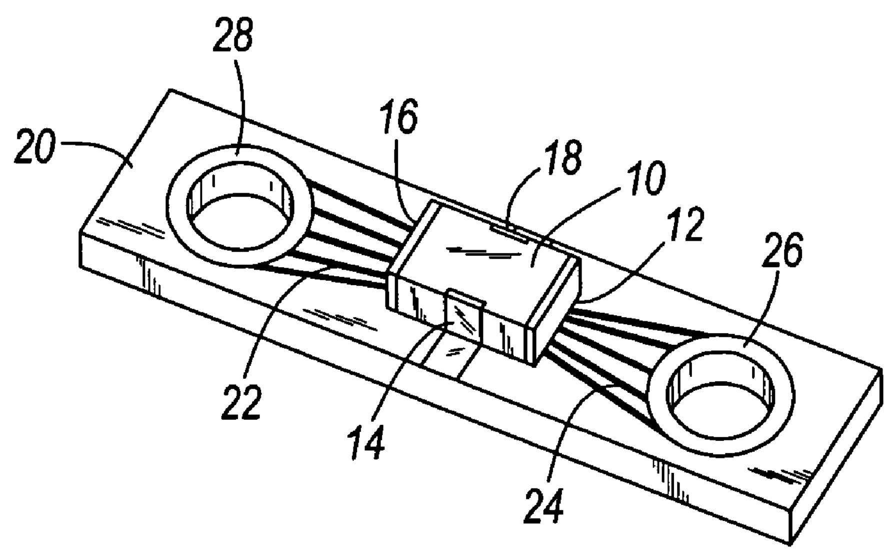
FIG. 2 illustrates the packaged circuit of FIG. 1 placed on a circuit board.

FIG. 2 illustrates the packaged circuit 10 connected to a circuit board 20. The packaged circuit 10 may be connected to the circuit board 20 by inserting pins of the packaged circuit into slots on the circuit board 20 or may be held in by brackets surrounding the packaged circuit 10 itself. The circuit board 20 also contains terminal traces 22 and 24 extending from signal terminals 12 and 16. The traces 22 and 24 provide electrical connections from the terminals 12 and 16 of the packaged circuit 10 to two secondary or interface terminals 26 and 28 arranged on the circuit board 20. In some embodiments, the traces 22 and 24 may be constructed from semiconductive material to link the signal terminals 12 and 16 of the packaged circuit 10 to the two secondary terminals 26 and 28. In general, the traces 22 and 24 may be any configuration that allows the secondary terminals 26 and 28 to be connectable to the two signal terminals 12 and 16 of the packaged circuit 10. The two secondary terminals 26 and 28 allow the terminals 12 and 16 to be displaced from the packaged circuit 10. In some embodiments, the secondary terminals 26 and 28 are the terminals that interface with a remote device rather than the signal terminals 12 and 16. In some embodiments, the secondary terminals 26 and 28 may be sized differently (e.g., larger) than the signal terminals 12 and 16 to facilitate the connection and installation of the packaged circuit 10 to another component. The packaged circuit 10 and the terminals 12 and 16 may be too small or located in problematic locations to properly connect to a remote component such as a motor and may require intricate wiring and/or soldering. The intricate wiring and/or soldering may be susceptible to vibrations, movements or other aspects of the environment causing the wires and/or soldering to break or become disconnected. The placement of the secondary terminals 26 and 28 may also be configured on the circuit board 20 so that the secondary terminals 26 and 28 are located closer to where they require connection to a device or component such as an electric motor so that connections such as wires can be shortened in length or eliminated entirely.

Figure 3:
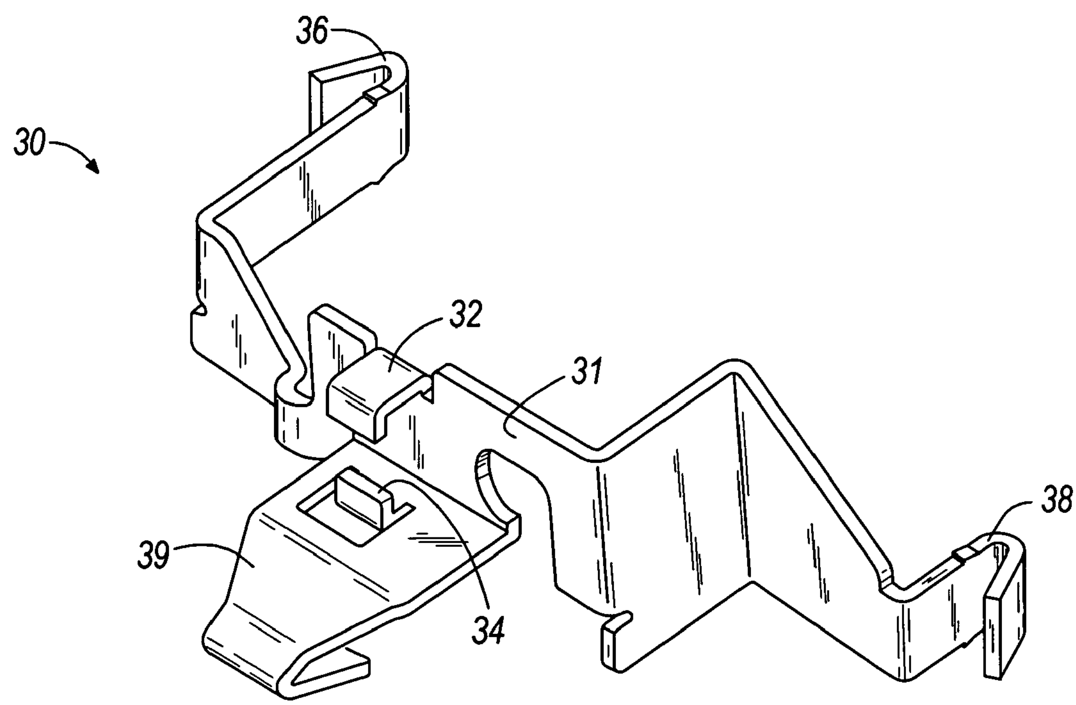
FIG. 3 is a perspective view of a bracket with two legs and three clips.

FIG. 3 illustrates a bracket 30. The bracket 30 has an upper surface 31 and two clips 32 and 34 located on each side of the upper surface 31. In some embodiments the clips 32 and 34 may be used to hold the circuit board 20 on the upper surface 31. The clips 32 and 34 may be configured to provide a snap or friction fit. The top of the clips 32 and 34 may include a lip that holds the circuit board 20 in place by pushing the top of the circuit board 20 onto the upper surface 31. The height of the clips 32 and 34 under the lip may be constructed to be the same height, or within a given margin, as the circuit board 20 to provide a secure fit under the lip.

To insert the circuit board 20 into the bracket 30, the clips 32 and 34 may be flexible and malleable and pushed open or apart in order to insert the circuit board 20. The clips 32 and 34 may "snap" back into place after the circuit board 20 has been placed under the lips. A spreading tool may also be used to move the clips 32 and 34 apart and together in order to insert and then hold the circuit board 20 on the upper surface 31 of the bracket 30. The circuit board 20 may also be slid under the clips 32 and 34 from one side of the bracket 30 and held in place through the pressure of the clips, or lips, on the circuit board 20. The circuit board 20 may also be held on the upper surface 31 using fasteners such as screws or bolts or an adhesive such as a conductive epoxy. In some embodiments, using the clips 32 and 34 may allow the circuit board 20 to be easily and quickly replaced since it snaps in and out from under the clips 32 and 34.

The bracket 30 also has two legs 36 and 38. As shown in FIG. 3, the legs 36 and 38 may have a clip at the end, similar to the clips 32 and 34, so that the bracket can be easily snapped into place on other components of the system. In alternative embodiments, the legs 36 and 38 may be attached to other components or structures by using screws, bolts, or other fasteners. The legs 36 and 38 may also be attached using an adhesive or solder. The bracket 30 may contain more or less legs or supports depending on the particular needs of the application at hand.

In some embodiments, the bracket 30 has a top support 39 to provide bracing and reinforcement for the bracket 30 like the two legs 36 and 38. The end of the top support 39 may also contain a clip like those located on the ends of the legs 36 and 38. The clip of the top support 39 may be configured to attach to a structure such as part of an electric motor in order to provide a ground path. The top support 39 may also be used as a handle or grip to place or remove the bracket 30. In some embodiments, the bracket 30 is constructed from a conductive material such as steel or other metals, conductive plastics, or the like.

Figure 4:
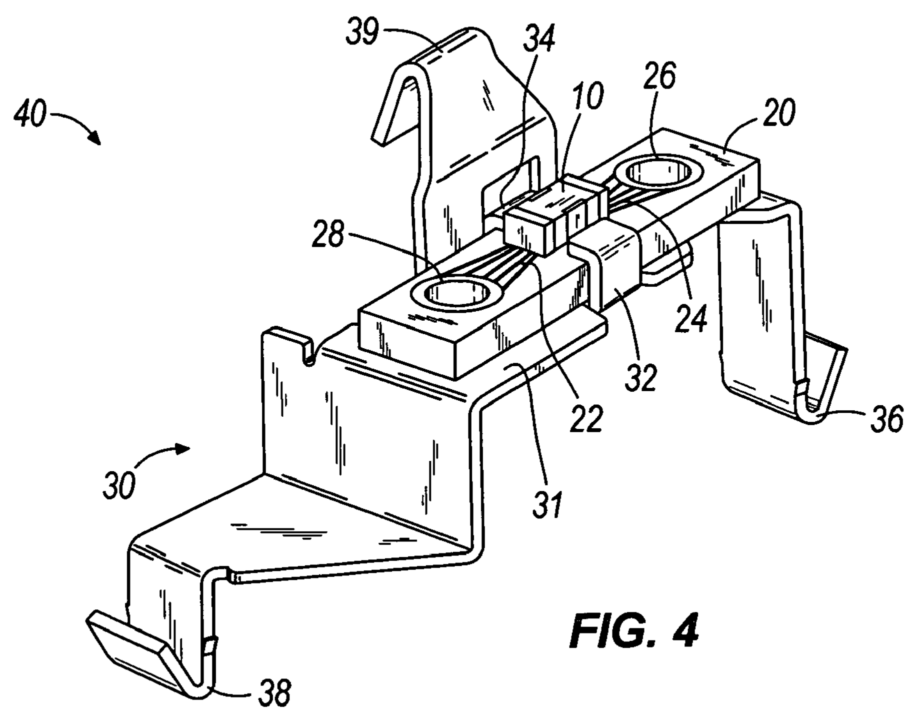
FIG. 4 is a perspective view of the bracket of FIG. 3 supporting the packaged circuit and circuit board of FIG. 2.

FIG. 4 illustrates an exemplary embodiment of a packaged circuit module 40 containing the packaged circuit 10, the circuit board 20, and the bracket 30. As shown in the figure, the two clips 32 and 34 hold the circuit board 20 in place on the upper surface 31 of the bracket 30. In embodiments where the bracket is conductive, the bracket and particularly the upper surface 31 may offer EMI shielding and ground connection to the circuit board 20 and packaged circuit 10.

Figure 5:
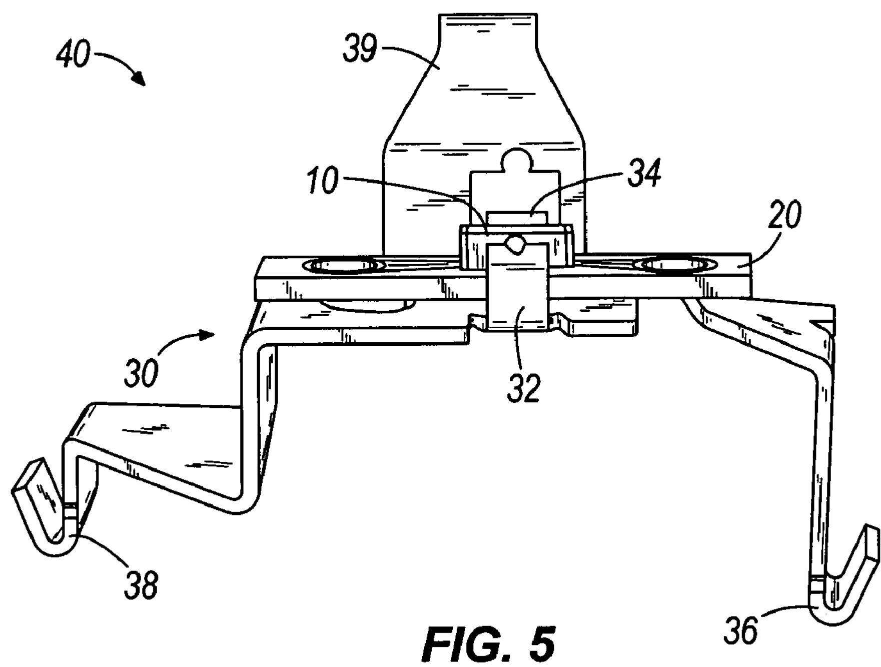
FIG. 5 is a front view of the bracket of FIG. 4 supporting the packaged circuit and circuit board of FIG. 2.
Figure 6A:
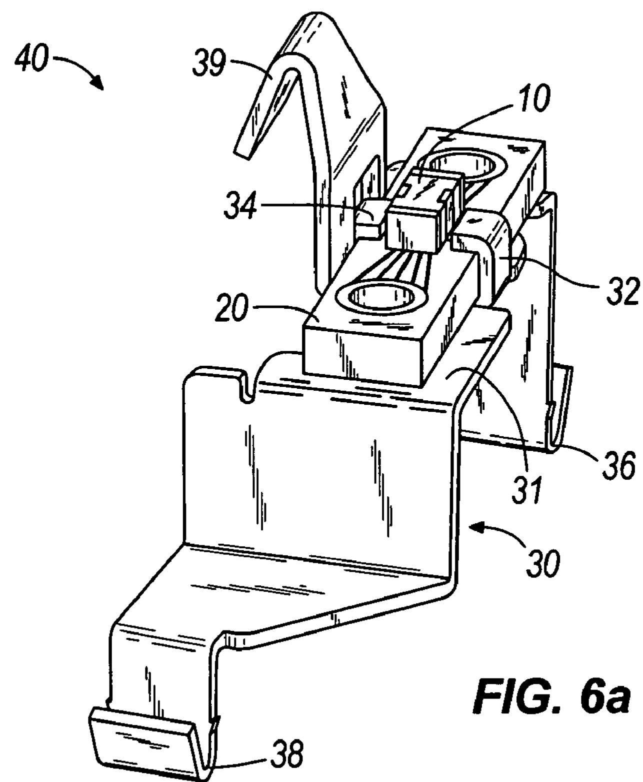
FIG. 6*a* is a side view of the bracket of FIG. 4.
Figure 6B:
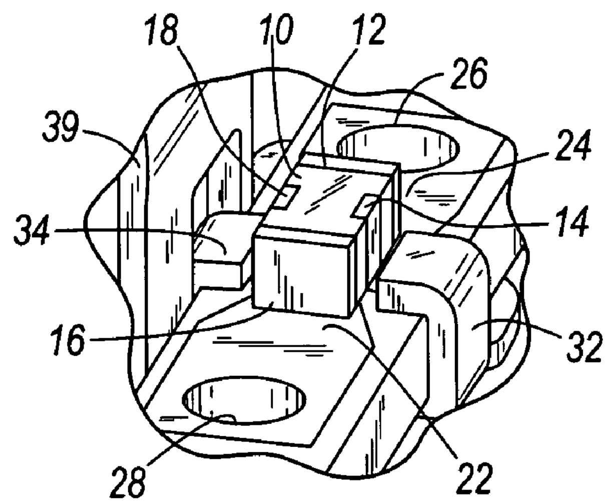
FIG. 6*b* is a detailed view of the bracket of FIG. 6*a*.

FIGS. 5 and 6 provide additional details of the packaged circuit module 40. As best seen by reference to FIGS. 6*a* and 6*b*, the circuit board 20 may be held on the bracket 30 by the two clips 32 and 34 with a friction fit. The two clips 32 and 34 are configured to hold the circuit board 20 on the upper surface 31. In some embodiments, the two clips 32 and 34 are connectable with the terminals 14 and 18 of the packaged circuit 10. As mentioned previously, the terminals 14 and 18 may be ground terminals of the packaged circuit 10. As previously described, an X2Y® device has two or more ground connections or terminals in order to reduce the line-to-ground path for capacitors. In some embodiments, where the bracket 30 is constructed from a conductive material and is attached to or interfaced with a component, device, or structure that would provide grounding through the clips of the two legs 36 and 38 and/or the clip of the top support 39, the two clips 32 and 34 may interface with the ground terminals 14 and 18 and may provide grounding for the packaged circuit 10. The clips 32 and 34 may provide grounding through a direct connection or may be soldered to the ground terminals 14 and 18 to ensure a proper connection and ultimately a proper grounding for the packaged circuit 10. The clips 32 and 34 may also be attached to the ground terminals 14 and 18 using an adhesive such as a conductive epoxy.

Figure 7:
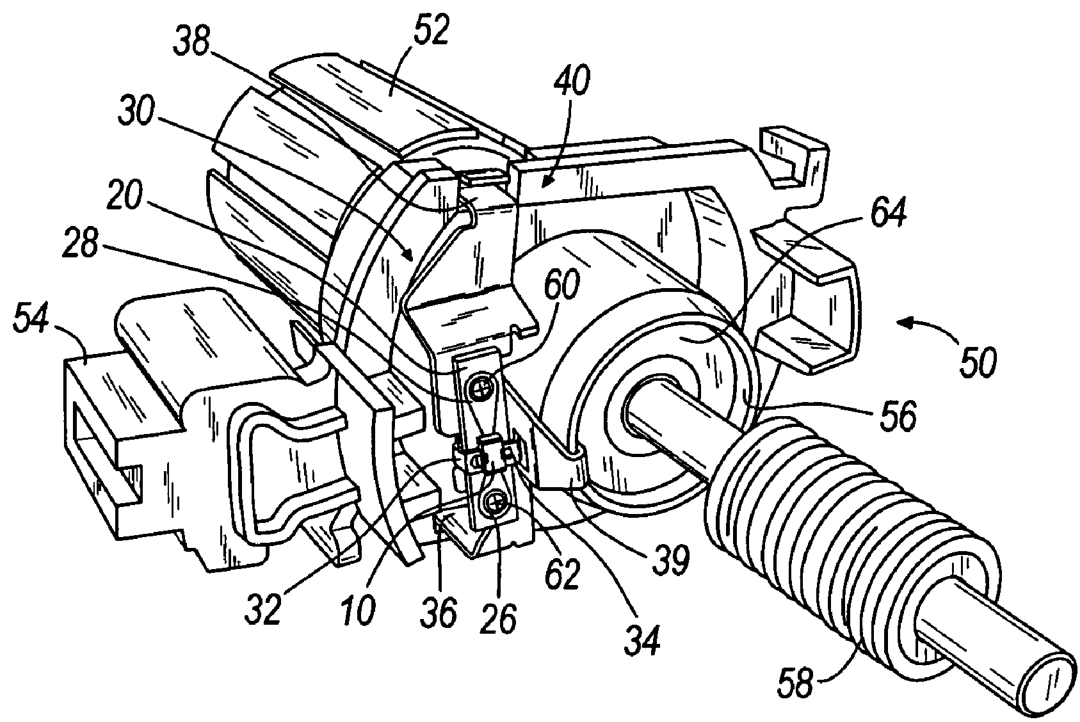
FIG. 7 illustrates one embodiment attached to an electric motor.

FIG. 7 illustrates the packaged circuit module 40 connected to an electric motor module 50. The motor module 50 includes an electric motor 52, a connector 54, a shroud 56, and a mechanical drive 58. The connector 54 may interface with a wire harness that provides power, ground, and other control connections. The shroud 56 provides shielding from debris and dust and provides separation between the electric motor 52 and the mechanical drive 58. The shroud may be constructed of an insulating or non-conductive material.

As seen in FIG. 7, the packaged circuit module 40 is located on the shroud 56. In the illustrated embodiment, the structure and design of the bracket 30, including the clips located at the ends of the legs 36 and 38 and the top support 39, snap onto the shroud 56. No additional fasteners such as screws or bolts are needed, which allows for quick replacement and reduced cost.

In some embodiments, the clip of the top support 39 may attach to a conductive retainer 64 surrounding the mechanical drive 58 in order to provide grounding. The mechanical drive 58 may create an antenna effect that generates an electromagnetic field. The clip of the top support 39 may provide a ground path that dissipates electromagnetic interference created by the mechanical drive 58.

In some embodiments, the placement of the secondary terminals 26 and 28 are configured such that the secondary terminals 26 and 28 align with the necessary component(s) and/or device(s) of the system. As seen in FIG. 7, the secondary or interface terminals 26 and 28 are located such that they automatically interface or connect with output terminals 60 and 62 protruding through the shroud 56. The output terminals 60 and 62 may represent power terminals routed from the electric motor 52. The signals from the output terminals 60 and 62 are received by the secondary terminals 26 and 28 and transmitted through the traces 22 and 24 to the signal terminals 12 and 16 of the packaged circuit 10. The signals from the output terminals 60 and 62 may represent power terminals used to operate the packaged circuit 10.

The secondary terminals 26 and 28 may also provide a connection to a device or component through direct contact, wires and/or soldering, a combination thereof, or alternate forms of connection.

Since the shroud 56 is an insulator and the bracket 30 is connected to it, the bracket 30, in particular the clips 32 and 34, can provide ground connections for the ground terminals 14 and 18 of the packaged circuit 10. As previously stated, the clips 32 and 34 may simply interface through contact with the ground terminals 14 and 18 or may be soldered to the terminals 14 and 18.

As previously described, the packaged circuit 10 may be configured to provide functionality other than electromagnetic filtering and may be located in systems other than those described. The construction of the bracket 30 may also be varied depending on the system and location of the packaged circuit 10. The bracket 30 may also consist of part of a preexisting component and/or device. In some embodiments, clips may be added to beams or other structures of the system that could be used to attach and support the circuit board 20 containing the packaged circuit 10. The packaged circuit 10 may also contain more than four terminals and may contain more or less ground terminals and/or signal terminals. The positions of the terminals 12, 14, 16, and 18 shown are for illustrative purposes only and other configurations are possible. The circuit board 20 may also be replaced with other structures and substrates capable of supporting a packaged circuit and providing terminal traces to secondary terminals such as an insert-molded plastic substrate. The terminal traces 22 and 24 and secondary terminals 26 and 28 may also be provided by and embedded in the bracket 30 itself. The circuit board 20 may also be permanently affixed to the bracket 30.

Various features and aspects of the invention are set forth in the following claims.

The invention claimed is:

1. A packaged circuit module comprising:

a packaged circuit containing a plurality of first signal terminals and one or more ground terminals;

a circuit board supporting the packaged circuit and containing a plurality of secondary terminals that are spaced from the first signal terminals of the packaged circuit;

a plurality of terminal traces positioned on the circuit board and leading from one or more of the plurality of first signal terminals to one or more of the plurality of secondary terminals; and a bracket configured to support the circuit board and having one or more clips configured to hold the circuit board in place on the bracket and to interface with the one or more ground terminals of the packaged circuit.

2. The packaged circuit module of claim 1, wherein the bracket is further configured to provide shielding.

3. An interference suppression module for an electric motor, the suppression module comprising:

a packaged circuit configured to suppress electromagnetic interference and containing one or more signal terminals configured to be connected to the electric motor and one or more ground terminals configured to be connected to ground;

a circuit board supporting the packaged circuit and containing terminal traces leading from the one or more signal terminals to one or more secondary terminals; and a bracket having one or more clips, the bracket configured to support the circuit board, the one or more clips configured to interface with one or more of the one or more ground terminals of the packaged circuit.

4. The suppression module of claim 3, wherein the bracket is further configured to provide the packaged circuit shielding from interference.

5. A method of constructing a packaged circuit module, the method comprising:

attaching a packaged circuit containing a plurality of signal terminals and one or more ground terminals to an upper surface of a circuit board containing a plurality of secondary terminals;

placing terminal traces on the upper surface of the circuit board, the terminal traces connecting one or more of the plurality of signal terminals of the packaged circuit to one or more of the plurality of secondary terminals contained on the upper surface of the circuit board; and supporting the circuit board with a bracket configured to interface with one or more of the one or more ground terminals of the packaged circuit.

6. The method of claim 5, further including holding the circuit board to the bracket with one or more clips.

7. The method of claim 6, further including soldering the one or more clips to one or more of the plurality of terminals of the packaged circuit.

8. A system of suppressing electromagnetic interference generated by a device, the system comprising:

a packaged circuit configured to suppress electromagnetic interference and containing one or more signal terminals configured to be connected to the device and one or more ground terminals configured to be connected to ground;

a circuit board containing the packaged circuit and terminal traces leading from the one or more signal terminals to one or more secondary terminals; and a bracket having one or more clips configured to hold the circuit board in place and to interface with one or more of the one or more ground terminals of the packaged circuit.

9. The system of claim 8, further comprising a device generating interference configured to be connected to one or more of the one or more secondary terminals.

10. A module for a packaged circuit having at least one ground terminal and at least one signal terminal, the module comprising:

a circuit board configured to hold the packaged circuit, the circuit board having an interface terminal and one or more traces electrically connecting the at least one signal terminal of the packaged circuit to the interface terminal; and a conductive bracket having a first side, the first side configured to support the circuit board and having at least one clip, the clip configured to hold at least a portion of the circuit board and to contact the at least one ground terminal of the packaged circuit, the conductive bracket configured to provide at least some electromagnetic shielding for the packaged circuit from sources of electromagnetic energy located opposite the first side of the bracket.

11. The module of claim 10, wherein the bracket has one or more supporting legs.

12. The module of claim 10, wherein the bracket has one or more clips configured to attach the bracket to a device interfacing with the at least one signal terminal.

13. The module of claim 10, wherein the clip is soldered to the at least one ground terminal.

14. A module for a packaged circuit having first and second ground terminals and first and second signal terminals, the module comprising:

a circuit board configured to hold the packaged circuit, the circuit board having first and second interface terminals, a first electrical connection between the first interface terminal and the first signal terminal of the packaged circuit and a second electrical connection between the second signal terminal of the packaged circuit and the second interface terminal; and a conductive bracket having a first side, the first side configured to support the circuit boards, and having at least one clip with first and second prongs, the clip configured to hold at least a portion of the circuit board, the first prong configured to contact the first ground terminal of the packaged circuit and the second prong configured to contact the second ground terminal of the packaged circuit, the conductive bracket configured to provide at least some electromagnetic shielding for the packaged circuit from sources of electromagnetic energy located opposite the first side of the bracket.

15. The module of claim 14, wherein the bracket has one or more supporting legs.

16. The module of claim 14, wherein the bracket has one or more clips configured to attach the bracket to a device interfaced with the first and second signal terminals.

17. The module of claim 14, wherein the first and second prongs are soldered to the first and second ground terminals.

18. A packaged circuit module comprising:

a packaged circuit containing a plurality of first signal terminals;

a substrate supporting the packaged circuit and containing a plurality of secondary terminals and a plurality of terminal traces leading from one or more of the plurality of first signal terminals to one or more of the plurality of secondary terminals; and a bracket having one or more legs, the bracket configured to support the substrate, the legs configured to be coupled to a shroud.

19. The packaged circuit module of claim 18, wherein the bracket is further configured to provide shielding.

20. The packaged circuit module of claim 18, wherein the bracket includes one or more clips configured to hold the substrate in place on the bracket.

21. The packaged circuit module of claim 20, wherein the one or more clips of the bracket are configured to interface with one or more of the plurality of first signal terminals.

* * * * *